US008301890B2

(12) United States Patent
Kaabouch et al.

(10) Patent No.: US 8,301,890 B2
(45) Date of Patent: Oct. 30, 2012

(54) SOFTWARE EXECUTION RANDOMIZATION

(75) Inventors: Majid Kaabouch, Rousset (FR); Eric Le Cocquen, Saint Maximin la Sainte Beaume (FR); Dominique Parlange, Trets (FR)

(73) Assignee: Inside Secure, Aix-en-Provence Cedex ( * ) Notice: Subject to any disclaimer, the term of this patent is extended or adjusted under 35 U.S.C. 154(b) by 1386 days.

(21) Appl. No.: 11/501,968

(22) Filed: Aug. 10, 2006

(65) Prior Publication Data
US 2008/0040607 A1     Feb. 14, 2008

(51) Int. Cl.
*G06F 21/00*     (2006.01)

(52) U.S. Cl. ............ 713/172; 380/278; 705/51; 705/52; 705/53; 709/229; 370/401; 713/176

(58) Field of Classification Search .................... 713/172
See application file for complete search history.

(56) References Cited

U.S. PATENT DOCUMENTS

| | | | |
|---|---|---|---|
| 3,570,006 A | | 3/1971 | Hoff et al. |
| 4,447,895 A | | 5/1984 | Asano et al. |
| 5,269,017 A | * | 12/1993 | Hayden et al. .................. 714/15 |
| 5,404,402 A | | 4/1995 | Sprunk |
| 5,471,598 A | * | 11/1995 | Quattromani et al. ........ 711/122 |
| 5,584,009 A | * | 12/1996 | Garibay et al. ............... 711/117 |
| 5,655,115 A | * | 8/1997 | Shen et al. .................... 712/239 |
| 5,692,168 A | * | 11/1997 | McMahan ..................... 712/237 |
| 5,724,536 A | * | 3/1998 | Abramson et al. ............ 712/216 |
| 5,764,946 A | * | 6/1998 | Tran et al. ..................... 712/239 |
| 5,768,610 A | * | 6/1998 | Pflum .............................. 712/23 |
| 5,802,544 A | * | 9/1998 | Combs et al. ..................... 711/5 |
| 5,956,753 A | * | 9/1999 | Glew et al. .................... 711/205 |
| 5,960,467 A | * | 9/1999 | Mahalingaiah et al. ...... 711/214 |
| 5,991,519 A | | 11/1999 | Benhammou et al. |

(Continued)

FOREIGN PATENT DOCUMENTS

CA     2333095     5/2005

(Continued)

OTHER PUBLICATIONS

An Instruction Fetch Unit for a High-Performance Personal Computer |http://research.microsoft.com/enus/um/people/blampson/34-doradoifu/34-doradoifuocr.doc|BUTLER W. LAMPSON|1984.*
International Search Report & Written Opinion PCT/US2007/078621, mailed Mar. 27, 2008, 11 pages.
International Search Report & Written Opinion PCT/US2007/075646, mailed Jan. 1, 2008, 12 pages.

(Continued)

*Primary Examiner* — Taghi Arani
*Assistant Examiner* — Mahfuzur Rahman
(74) *Attorney, Agent, or Firm* — Panitch Schwarze Belisario & Nadel LLP

(57) ABSTRACT

A method of processing programming instructions may include identifying an instruction to be fetched; determining if the identified instruction is protected; if the identified instruction is protected, selecting an alternate instruction from a plurality of alternate instructions corresponding to the identified protected instruction, and fetching the selected alternate instruction; and if the identified instruction is not protected, fetching the identified instruction. Identifying the instruction to be fetched may include identifying an address stored in a program address pointer. Determining if the identified instruction is protected may include comparing the address stored in the program address pointer to one or more addresses stored in a first memory portion, and determining if there is a correspondence. Selecting the alternate instruction may include randomly or pseudo-randomly selecting an instruction from one or more corresponding alternate instructions stored in a second memory portion, and storing the selected instruction in the program address pointer.

32 Claims, 6 Drawing Sheets

U.S. PATENT DOCUMENTS

| | | | |
|---|---|---|---|
| 6,032,248 | A | 2/2000 | Curry et al. |
| 6,061,449 | A | 5/2000 | Candelore et al. |
| 6,094,724 | A | 7/2000 | Benhammou et al. |
| 6,108,775 | A * | 8/2000 | Shiell et al. ............... 712/240 |
| 6,144,230 | A | 11/2000 | Kim |
| 6,189,068 | B1 * | 2/2001 | Witt et al. ..................... 711/3 |
| 6,278,783 | B1 | 8/2001 | Kocher et al. |
| 6,295,606 | B1 | 9/2001 | Messerges et al. |
| 6,298,442 | B1 | 10/2001 | Kocher et al. |
| 6,304,658 | B1 | 10/2001 | Kocher et al. |
| 6,327,661 | B1 | 12/2001 | Kocher et al. |
| 6,331,784 | B1 | 12/2001 | Mason et al. |
| 6,381,699 | B2 | 4/2002 | Kocher et al. |
| 6,404,217 | B1 | 6/2002 | Gordon |
| 6,493,260 | B2 | 12/2002 | Micheloni et al. |
| 6,510,518 | B1 | 1/2003 | Jaffe et al. |
| 6,539,092 | B1 | 3/2003 | Kocher |
| 6,609,201 | B1 | 8/2003 | Folmsbee |
| 6,654,884 | B2 | 11/2003 | Jaffe et al. |
| 6,695,214 | B1 | 2/2004 | Leydier et al. |
| 6,748,410 | B1 | 6/2004 | Gressel et al. |
| 6,873,706 | B1 | 3/2005 | Miyazaki et al. |
| 6,877,100 | B1 | 4/2005 | Nobunaga et al. |
| 7,280,548 | B2 * | 10/2007 | Sampath et al. ............ 370/401 |
| 7,613,907 | B2 | 11/2009 | Kaabouch et al. |
| 2002/0124178 | A1 | 9/2002 | Kocher et al. |
| 2002/0128794 | A1 | 9/2002 | Miyazaki et al. |
| 2003/0044003 | A1 | 3/2003 | Chari et al. |
| 2003/0091191 | A1 | 5/2003 | Watanabe et al. |
| 2003/0120938 | A1 * | 6/2003 | Mullor ......................... 713/190 |
| 2004/0162993 | A1 | 8/2004 | Teglia |
| 2004/0268116 | A1 * | 12/2004 | Vasisht et al. ............... 713/100 |
| 2005/0069138 | A1 * | 3/2005 | de Jong ........................ 380/278 |
| 2005/0144417 | A1 | 6/2005 | Sheriff et al. |
| 2005/0271202 | A1 | 12/2005 | Shu et al. |
| 2005/0273630 | A1 | 12/2005 | Shu et al. |
| 2005/0273631 | A1 | 12/2005 | Shu et al. |
| 2006/0045264 | A1 | 3/2006 | Kocher et al. |
| 2009/0254752 | A1 * | 10/2009 | Johansson .................... 713/176 |

FOREIGN PATENT DOCUMENTS

| | | |
|---|---|---|
| EP | 1 674 966 | 6/2006 |
| EP | 1674966 | 6/2006 |
| WO | WO 99/01815 | 1/1999 |
| WO | WO99/01815 | 1/1999 |
| WO | WO 01/55821 | 8/2001 |
| WO | WO 2004/112306 A2 | 12/2004 |

OTHER PUBLICATIONS

USENIX Technical Program—Paper—Smartcard 99, Oliver Kömmerling, "Design Principles for Tamper-Resistant Smartcard Processors", http://www.usenix.org/publications/library/proceedings/smartcard99/full_papers/kommerling/kommerling_html/index.html May 1999, 21 pages.

Atmel "AT91SC Family High Performance Secure Cryptocontrollers" www.atmel.com/dyn/resources/prod-documents/doc 1593.pdf, Sep. 2005, 2 pages.

Atmel "Development Support AT90SC and AT91SC Families" www.atmel.com/dyn/resources/prod-documents/doc1599.pdf, Sep. 2005, 2 pages.

Atmel "Secure Microcontrollers for Smart Cards AT90SC9616RC" Rev. Jan. 2003, 4 pages.

Atmel "Security with Atmel—Hard to Crack" www.atmel.com/dyn/resources/prod-documents/doc1596.pdf, Sep. 2005, 2 pages.

Atmel Secure Products, www.atmel.com/dyn/resources/prod-documents/doc.6523.pdf, 2005, 20 pages.

Atmel Security Applications "Limiting Illegal Hardware Copies by Using Secure Hardware Authentication" http://www.atmel.com/dyn/products/other-docs.asp?family_id=662, Updated Feb. 2005, pp. 24-26.

NAGRAVISION "Technology Series—White Paper STB Security" www.nagravision.com/pdf/NV_TechServics_STBsecurity.pdf, 2005, 8 pages.

Tual, Jean-Pierre, "New Challenges in Smart Card Design," Axalto presentation, MPSOC '05, Jul. 13, 2005.

Li, Huiyun, "Security evaluation at design time for cryptographic hardware," Technical Report No. 665, University of Cambridge Computer Laboratory, Document UCAM-CL-TR-665/ISSN 1476-2986, Apr. 2006.

Kocher et al., "Differential Power Analysis," (http://www.cryptography.com/resources/whitepapaers/DPA.pdf),Technical Report, 1998, later published in Advances in Cryptology—*Crypto 99 Proceedings, Lecture Notes in Computer Science*, vol. 1666, M Wiener, ed., Springer-Verlag, 1999, 10 pages.

Schuster, Andreas, "Differential Power Analysis of an AES Implementation," Technical Report IAIK-TR June 25, 2004, 12 pages.

International Preliminary Report on Patentability—PCT/US2007/075446, mailed Nov. 13, 2008, 6 Pages.

Response to Written Opinion,—PCT/US2007/075446, faxed Jun. 9, 2008, 11 pages.

* cited by examiner

SOFTWARE EXECUTION RANDOMIZATION

TECHNICAL FIELD

The disclosed implementations relate to electrical circuits.

BACKGROUND

Secure integrated circuit cards, commonly referred to as smart cards, may be of the form of an embedded integrated circuit hardware device that is small enough to fit into a user's pocket. Secure integrated circuit cards may be used in many situations where critical information must be stored and shared. For example, set-top boxes that facilitate pay-per-view or video-on-demand features may use a secure integrated circuit card to supply user account information to a provider along with a request for access to such features, and to subsequently decrypt encrypted digital video streams that may be provided in response to the request. As another example, a Subscriber Identity Module (SIM) card in a Global Systems for Mobile Communications (GSM) phone may be used to store a user's personal information, such as his or her phone book, device preferences, preferred network(s), saved text or voice messages and service provider information. A SIM card may allow a user, for example, to change handsets while retaining all of his or her information on the SIM card. Smart cards may be used in a variety of applications (e.g., electronic payment systems, including specialized auto-debit devices such as public transportation cards and personal identification documents, such as passports, drivers licenses, and medical identification cards).

Due to security concerns, encryption standards or algorithms may be used to protect sensitive information on a smart card. For example, the Digital Encryption Standard (DES) may be used to encrypt information with a 56-bit key. Access to private data may only be available to a holder of the key. Newer updates to this standard, such as Triple-DES and Advanced Encryption Standard (AES) may offer an even more complex (and secure) encryption key algorithm. Another example standard is RSA (an acronym derived from the surnames of its three creators—Rivest, Shamir and Adleman), a public-key encryption standard with private-key decryption.

Because of the value of information that may be stored on and protected by a smart card, hackers may employ various techniques to break or bypass various encryption algorithms used to protect sensitive information on a smart card. Various techniques employed by hackers to break or bypass the encryption algorithms may generally be categorized as invasive attacks and non-invasive attacks.

In an invasive attack, a hacker may physically disassemble the smart card in order to access, monitor and control its internal circuitry. Once the smart card has been disassembled (e.g., the packaging has been removed), the hacker may inspect internal circuitry with, for example, an optical microscope or similar viewing apparatus or may employ a logic probe or analyzer in an attempt to understand timing and functionality of the hardware employed. A hacker may slow or speed up a clock signal or subject a power supply to voltage glitches, which may have the effect of placing the hardware in a vulnerable state. A hacker may use a laser to remove protective circuitry in order to, for example, permanently disable encryption or decryption functionality. A hacker may also employ a directed light beam or other light or radiation source to modify the value of a particular hardware element. For example, the hacker may force a logic gate to have a particular value. Each of these example methods may be employed by a hacker to either create a vulnerability in the device that can be subsequently exploited or to glean information about the operation of the device.

A hacker may also attempt to inject "faults" into a smart card or other secure device, in order to extract sensitive information or corrupt the operation of the device. For example, rather than observing the smart card in its typical operation, a hacker may inject a "glitch" into the circuitry and analyze the circuit's response. In particular, the hacker may temporarily speed up a clock signal, in order to, for example, cause inputs to be sampled before updated information has propagated through a circuit—possibly bypassing key security, or revealing details about how the circuit functions. A hacker may inject a voltage glitch to, for example, temporarily shift the threshold voltages of transistors or logic gates. Such a voltage glitch may cause the hardware to skip certain procedures, allowing the hacker to commandeer portions of the logic or hijack data before it is encrypted, etc.

A hacker may also employ non-invasive, or "side channel" attacks to discover functional details of a smart card. In particular, a hacker may observe various aspects of the smart card in operation, and apply statistical analysis to the observed aspects to deduce operational details of the smart card or to extract sensitive information (e.g., encryption or decryption keys). For example, the hacker may use differential power analysis (DPA) to analyze power consumption during smart card operations. Since the power consumption may be directly related to particular operations, the hacker may be able to deduce, for example, particular bits of a key used in a decryption algorithm, by observing many instances of a particular operation and applying statistical analysis to the observations. Similarly, a hacker may employ electromagnetic analysis (EMA) to monitor radiation output of a smart card during particular operations; statistical analysis of the radiation may also reveal sensitive information. A hacker may also analyze timing between variations in power consumption or electromagnetic radiation to identify times at which key operations of known algorithms (e.g., encryption or decryption algorithms) are performed.

Once a hacker has extracted sensitive information from a device, the hacker may use the sensitive information for various nefarious purposes. For example, the hacker may obtain pay-per-view or video-on-demand services using another user's account; the hacker may access telecommunication services that are billed to another user; the hacker may steal another user's bank account funds; the hacker may steal another's identity; etc.

SUMMARY

Countermeasures to attacks of secure devices may include minimizing the usefulness of "leaked" information. In particular, adding entropy or unpredictability to the leaked information may make it more difficult for hackers to extract sensitive information from the device. In some implementations, such entropy may be added by randomly or pseudo-randomly replacing a "protected" instruction or function with another alternate instruction or function, such that each time the protected instruction or function is called or executed to perform some operation, the operation may have a different power consumption, timing, or electromagnetic radiation "signature."

In some implementations, a method includes identifying an instruction to be fetched; determining if the identified instruction is protected; if the identified instruction is protected, selecting an alternate instruction from a plurality of alternate instructions corresponding to the identified protected instruction, and fetching the selected alternate instruction; and if the identified instruction is not protected, fetching the identified instruction.

Selecting the alternate instruction may include randomly or pseudo-randomly selecting the alternate instruction from the plurality of alternate instructions. Randomly or pseudo-randomly selecting the alternate instruction may include randomly or pseudo-randomly selecting an instruction from one or more corresponding alternate instructions stored in a second memory portion, and storing the selected instruction in the program address pointer. Identifying the instruction to be fetched may include identifying an address stored in a program address pointer; determining if the identified instruction is protected may include comparing the address stored in the program address pointer to one or more addresses stored in a first memory portion, and determining if there is a correspondence. Identifying an instruction to be fetched may include identifying an opcode and corresponding operand stored in an instruction buffer; determining if the identified instruction is protected may include comparing the identified opcode and corresponding operand to one or more opcodes and corresponding operands stored in a first memory portion, and determining if there is a correspondence; selecting an alternate instruction may include randomly or pseudo-randomly selecting an alternate opcode/operand combination from one or more corresponding alternate opcode/operand combinations stored in a second memory portion, and storing the selected alternate opcode/operand combination in the instruction buffer.

In some implementations, an instruction fetch unit includes a first memory portion whose contents identify an address of a protected instruction; a second memory portion whose contents store addresses of a plurality of alternate instructions corresponding to the protected instruction; a replacement unit that a) determines whether an instruction to be fetched corresponds to the contents of the first memory portion, and if so, b) replaces an address associated with the instruction to be fetched with an address selected from the second memory portion; and an interface that fetches an instruction.

Replacing the address associated with the instruction to be fetched may include randomly or pseudo-randomly selecting an address of an instruction from corresponding addresses in the second memory portion, and replacing the contents of the first memory portion with the selected address. The instruction fetch unit may further include a pseudo-random/random address generator that selects a corresponding address from the second memory portion to use in replacing the address associated with instruction to be fetched.

In some implementations, an instruction fetch unit includes a first memory portion whose contents identify an address of an instruction to be fetched; a second memory portion whose contents identify an address of a protected instruction; a third memory portion whose contents store addresses of a plurality of alternate instructions corresponding to the protected instruction; a replacement unit that a) determines whether the contents of the first memory correspond to the contents of the second memory, and if so, b) replaces the contents of the first memory with an address selected from the third memory; and an interface that fetches an instruction corresponding to the contents of the first memory.

Replacing the contents of the first memory portion with the address selected from the third memory portion may include randomly or pseudo-randomly selecting a corresponding address of an alternate instruction from the third memory portion, and replacing the contents of the first memory portion with the selected address. In some implementations, the first memory portion includes a program address pointer; in some implementations, the first memory portion includes a program counter. The second memory portion may include a protected function address register.

In some implementations, a method of processing instructions in an instruction stream includes identifying an instruction in an instruction stream that calls a function; determining if the function to be called is a protected function; and if the function to be called is a protected function, selecting an alternate function from a plurality of alternate functions corresponding to the protected function, and replacing the identified instruction with an instruction that calls the selected alternate function.

The instruction stream may be a sequence of compiled instructions to be written to a computing device's instruction memory; the instruction stream may be a sequence of instructions in a computing device's instruction buffer. Selecting the alternate function may include random or pseudo-randomly selecting an alternate function from the plurality of alternate functions.

In some implementations, an instruction fetch unit includes a program address pointer that stores an address of an instruction to be fetched; a protected instruction address register (PIAR) that stores an address of a protected instruction; a memory portion that stores addresses of a plurality of alternate instructions corresponding to the protected instruction; a replacement unit that a) determines whether the address stored in the program address pointer corresponds to the address stored in the PIAR, and if so, b) replaces the address stored in the program address pointer with an address selected from the addresses stored in the memory portion; and an interface that fetches an instruction corresponding to either the address stored in the program address pointer or the replaced address stored in the program address pointer. The instruction fetch unit may further include a pseudo-random/random address generator that selects an address with which to replace the address stored in the program address pointer from the addresses stored in the memory portion.

In some implementations, a device includes a processor that executes programming instructions; a memory portion that stores programming instructions; an instruction fetch unit that fetches a programming instruction from the memory portion and provides the fetched programming instruction to the processor for execution; and a replacement unit that replaces the fetched programming instruction with an alternate programming instruction and provides the alternate programming instruction to the processor for execution when the fetched programming instruction is a protected programming instruction.

In some implementations, the device further includes an interface that receives input to be processed by the processor from a wired communication channel; the wired communication channel can include a smart card reader contact. In some implementations, the device further includes an interface that receives input to be processed by the processor from a wireless communication channel; the wireless communication channel can include a smart card reader interface, a portion of which complies with International Organization for Standardization (ISO)/International Electrotechnical Commission (IEC) standard 14443 or standard 15693. In some implementations, the device further includes a power conversion circuit that receives electromagnetic energy from a source external to the device and converts the electromagnetic energy to electrical energy that powers at least one of the processor, the memory portion, the instruction fetch unit or the replacement unit. In some implementations, the device further includes a power storage device that powers at least one of the processor, the memory portion, the instruction fetch unit or the replacement unit.

In some implementations, a device includes a processor means that executes programming instructions; a memory means that stores programming instructions; an instruction fetch means that fetches a programming instruction from the memory means and provides the fetched programming instruction to the processor means for execution; and a replacement means that replaces the fetched programming instruction with an alternate programming instruction and provides the alternate programming instruction to the processor means for execution when the fetched programming instruction is a protected programming instruction. The device can further include a means for determining whether the fetched programming instruction is a protected programming instruction. The device can further include an interface means that receives input to be processed by the processor means from a wireless communication channel. The device can further include a power conversion means that receives electromagnetic energy from a source external to the device and converts the electromagnetic energy to electrical energy that powers at least one of the processor means, the memory means, the instruction fetch means or the replacement means.

The details of one or more implementations are set forth in the accompanying drawings and the description below. Other features, objects, and advantages will be apparent from the description and drawings, and from the claims.

BRIEF DESCRIPTION OF DRAWINGS

Like reference symbols in the various drawings indicate like elements.

DETAILED DESCRIPTION

Figure 1A:
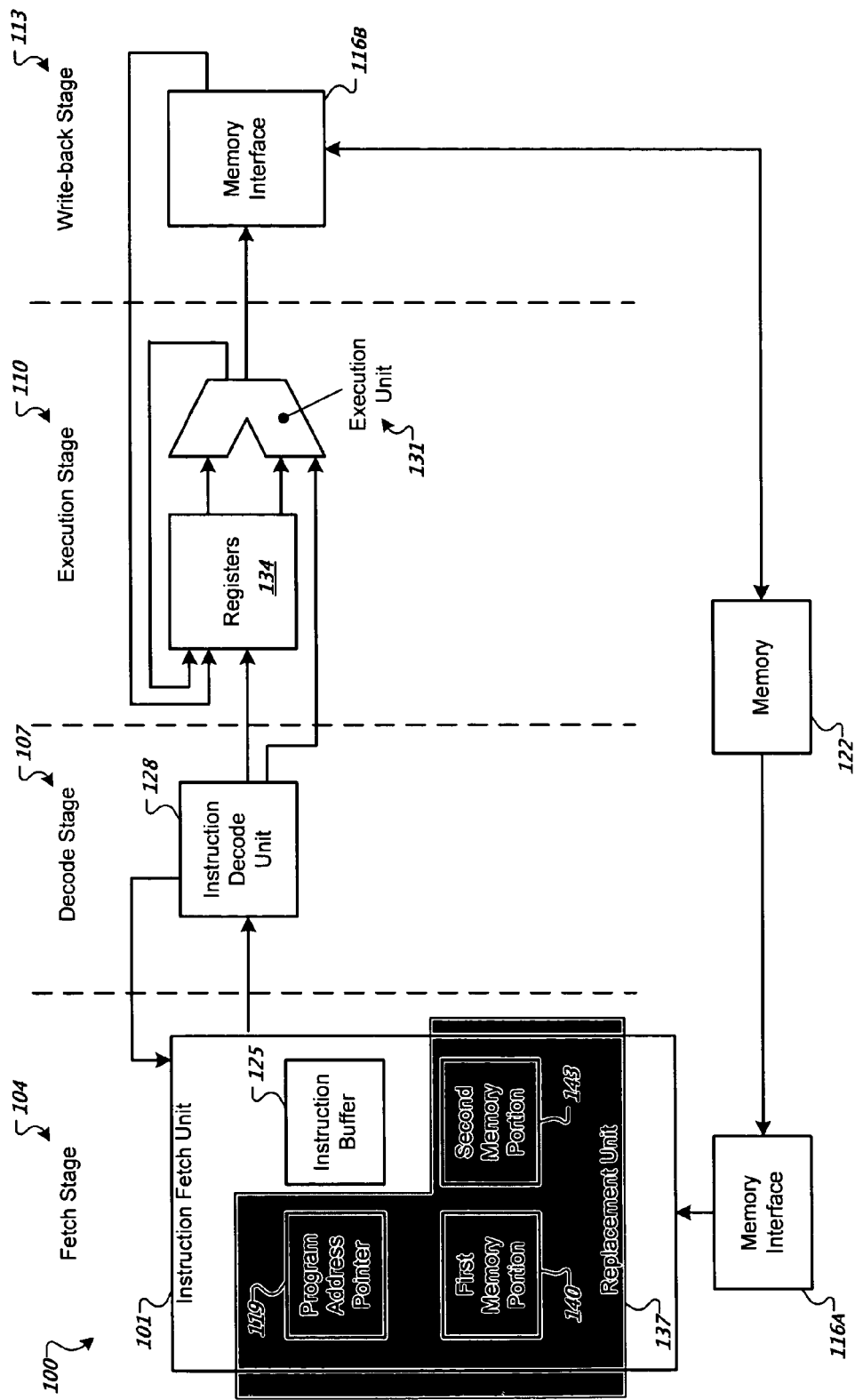
FIG. 1A is a block diagram of an example system that fetches, decodes and executes programming instructions and that includes an instruction replacement unit.

FIG. 1A is a block diagram of an exemplary system 100 that fetches, decodes and executes programming instructions. The system 100 can function to minimize usefulness of information that is "leaked" and thereby strengthen security of operations provided by various instructions that are executed by the system 100. In particular, some implementations of the system 100 include an instruction replacement unit 137 that determines whether an instruction to be fetched is protected, and if so, replaces the instruction with an alternate instruction. The alternate instruction can be randomly or pseudo-randomly selected from a plurality of possible alternate instructions.

The system 100 in FIG. 1A processes programming instructions in four exemplary phases: instructions are fetched in an instruction fetch stage 104, decoded in an instruction decode stage 107, executed in an execution stage 110, and data may optionally be stored in memory in a write-back stage 113. Other numbers of stages are possible and not all of the stages are required (e.g., write-back is not required in some implementations).

To fetch instructions in the instruction fetch stage 104, the system 100 includes an instruction fetch unit 101 and a memory interface 116A. As shown, the instruction fetch unit 101 includes a program address pointer 119—sometimes referred to as an instruction pointer or a program counter. In some implementations, the program address pointer stores an address of an instruction to be fetched next from memory 122. At some point during the instruction fetch stage 104, the memory interface 116A fetches the next appropriate instruction, based, for example, on an address stored in the program address pointer 119.

Optionally, the instruction fetch unit 101 includes an instruction buffer 125 for storing a number of instructions. In some implementations, the instruction buffer 125 can be used to queue several instructions or to facilitate instruction reordering. In addition, the instruction buffer 125 can be used to store multiple possible instructions, such as, for example, all possible next instructions following a branch instruction.

To decode instructions in the instruction decode stage 107, the system 100 includes an instruction decode unit 128. The instruction decode unit 128 can parse each instruction into, for example, an operation code (opcode), register operands, or immediate values. In response to the opcode, the instruction decode unit 128 can control various aspects of the system 100, as will be described in more detail below.

To execute instructions in the execution stage 110, the system 100 includes an execution unit 131 and one or more registers 134 for storing operands and results of operations performed by the execution unit 131. In some implementations, the execution unit 131 performs mathematical operations, such as addition, subtraction or multiplication of operands; the execution unit 131 can perform logical operations, such as, AND, OR, XOR, NAND, etc.; or, the execution unit 131 can perform a bit-shifting operation. In some implementations, the execution unit 131 includes an arithmetic logic unit (ALU) or a floating point unit (FPU) to perform the above-described example operations.

To store results of operations performed in the execution stage 110 (e.g., during the write-back stage 113) the system 100 includes a memory interface 116B. The memory interface 116B can store a result from the execution unit 131 in the memory 122. The memory interface 116B can also move data from the memory 122 to the registers 134 (not shown in FIG. 1A) for some operations performed in the execution stage 110. The memory interface 116B and the memory interface 116A may be part of the same overall memory interface, or the memory interfaces 116B and 116A may be separate interfaces. Moreover, the memory 122, shown as a single memory, may in fact include separate memories. For example, in a "von Neumann architecture," a single memory space is used for both data and instructions, whereas in a "Harvard architecture," separate memory spaces are used for data and instructions.

As shown, the system 100 also includes a replacement unit 137 that, in some implementations, replaces certain instructions with other alternate instructions. In particular, the replacement unit 137 can replace a "protected" instruction with an alternate instruction; in some implementations the alternate instruction is randomly or pseudo-randomly selected from a number of possible alternate instructions.

In some implementations, to replace protected instructions with alternate instructions, the replacement unit 137 employs a first memory portion 140 and a second memory portion 143. The first memory portion 140 stores address(es) associated with one or more protected instructions. The second memory portion 143 stores addresses associated with one or more alternate instructions. The replacement unit 137 can compare an address stored in the program address pointer 119 with address(es) stored in the first memory portion 140 to determine if the next instruction to be fetched is a protected instruction. If the next instruction to be fetched is a protected instruction (e.g., the address stored in the program address pointer 119 matches an address stored in the first memory portion 140), the replacement unit 137 can replace the address stored in the program address pointer 119 with a corresponding alternate address selected from the second memory portion 143. In effect, the replacement of the address in the program address pointer 119 causes the instruction fetch unit 101 to fetch an alternate instruction, rather than fetching the protected instruction.

In some implementations, the first memory portion 140 stores instruction opcodes and corresponding operands, and the second memory portion 143 stores alternate instruction opcodes and corresponding operands. In these implementations, the replacement unit 137 replaces a prefetched opcode/operand combination (e.g., in the instruction buffer 125) that matches a "protected" opcode/operand combination stored in the first memory portion 140 with an alternate opcode/operand combination stored in the second memory portion 143. For example, the protected opcode/operand combination may be "call [protected_function]," and the replacement unit may replace this combination with another opcode/operand combination such as "call [alternate_function]." The alternate opcode/operand combination may be one of several possible opcode/operand combinations that corresponds to the opcode/operand combination to be replaced. That is, the first memory portion 140 can store several "protected" opcode/operand combinations, and each protected combination may correspond to one or more alternate opcode/operand combinations; this correspondence is explained in further detail with reference to FIG. 1B.

Figure 1B:
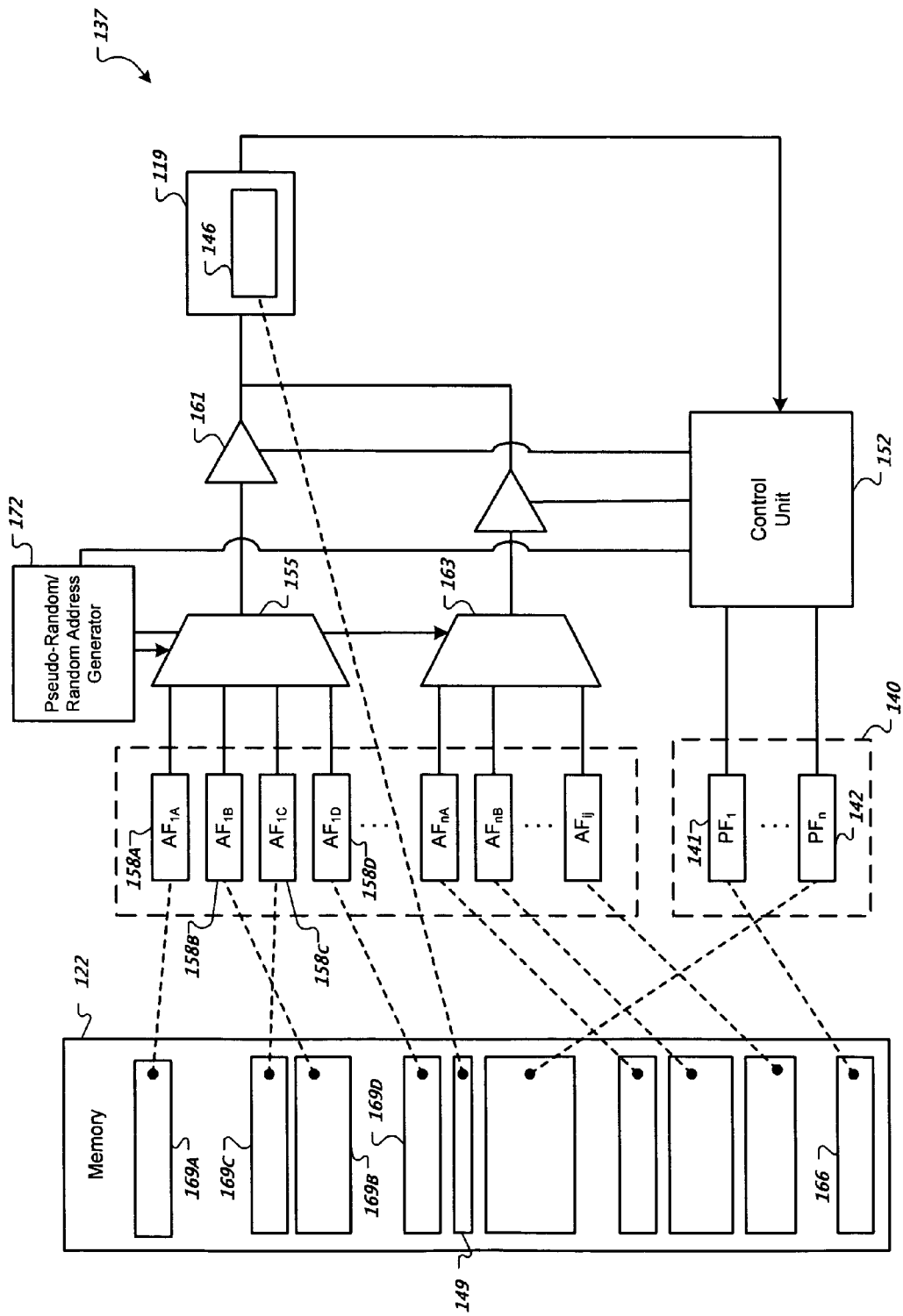
FIG. 1B is a block diagram that illustrates details of an example instruction replacement unit.

FIG. 1B is a block diagram that illustrates example details of the replacement unit 137 shown in FIG. 1A, according to some implementations. As described above, the replacement unit 137 includes the program address pointer 119, which, in some implementations, stores an address 146 of a next instruction 149 to be fetched from memory 122. (That is, the address 146 stored in the program address pointer 119 "points to" the next instruction 149 to be fetched (pointing depicted by a dashed line)). In some implementations, the program address pointer 119 is a latch that periodically latches in a new value corresponding to the address of the next instruction to be fetched. The new value can be automatically incremented to fetch the "next" instruction in a sequential instruction stream; the new value can be provided by a previous instruction (e.g., in the case of an unconditional jump); the new value can be provided by a previous instruction and some operation performed by the execution unit 131 (e.g., in the case of a conditional branch where the condition is the result of some logical operation performed by the execution unit 131); or, the new value can be provided by the replacement unit 137, as described in more detail below.

The replacement unit 137 includes the first memory portion 140, which can store address(es) of one or more protected instructions. In some implementations, the first memory portion 140 is a series of registers (not shown), and each register is configured to store an address of a different protected instruction. For example, the register 141 stores an address of an instruction in a first protected function ("$PF_1$") and the register 142 stores an address of an address in an $n^{th}$ protected function ("$PF_n$").

The replacement unit 137 includes a control unit 152 that can compare a current value of the program address pointer 119 to each address stored in the first memory portion 140 (e.g., the value stored in each register 141 to 142). If the control unit 152 determines that the current value of the program address pointer 119 corresponds to the address of a protected instruction, the control unit 152 can cause an address of an alternate instruction to be stored in the program address pointer 119.

In some implementations, to store an address of an alternate instruction in the program address pointer 119, in place of a protected instruction (e.g., "$PF_1$"), the control unit 152 selectively couples a multiplexer 155 associated with a number of alternate instruction addresses 158A-D to the program address pointer 119. For example, as shown, the control unit 152 selectively enables a pass-through buffer 161 coupled to the multiplexer 155 (e.g., a normally tri-stated pass-through buffer), to couple the output of the multiplexer 155 to the program address pointer 119. As described above, the program address pointer 119 may be a latch that periodically latches in a new value; after enabling the pass-through buffer 161, the control unit 152 can cause the program address pointer 119 to latch in the value output by the multiplexer 155.

In some implementations, each protected instruction address may be associated with, or correspond to, a number of alternate instruction addresses which can be selected by a corresponding multiplexer. For example, as shown, the multiplexer 155 selects one of the alternate instruction addresses "$AF_{1A}$" 158A, "$AF_{1B}$" 158B, "$AF_{1C}$" 158C, or "$AF_{1D}$" 158D in place of the protected function address "$PF_1$" 141; the multiplexer 163 selects one of the alternate instruction addresses "$AF_{nA}$," "$AF_{nB}$," or "$AF_{nj}$" in place of the protected instruction address "$PF_n$" 142. The correspondence between protected instruction addresses and certain corresponding alternate instruction addresses can facilitate the performance of similar operations or the achievement of similar general results using different instructions, as is described in greater detail below.

As depicted by the dashed lines coupling the various addresses and portions of memory 122, each protected instruction address and each alternate instruction address corresponds to one or more instructions stored in memory 122. In some implementations, the instructions stored in memory 122 may each be associated with a function. For example, the protected instruction "$PF_1$" is depicted as a function call that calls a function 166 (e.g., a function that performs a security related operation in a secure device, such as, for example, a function in an encryption or decryption algorithm).

As is described in more detail with reference to later figures, hackers may try to learn details about the operation of the function 166; in particular, if the function 166 is repeatedly called by the protected instruction "$PF_1$" during operation of a secure device, hackers may be able to apply differential power analysis (DPA) and various statistical analysis techniques to extract secure information from "leaked" "side-channel" data. One countermeasure is to minimize the usefulness of leaked side-channel information; and one method of minimizing such information is to add entropy, or unpredictability, to information that is leaked.

One method of adding entropy to leaked information is to randomly or pseudo-randomly call one of several alternate functions 169A-D in place of the protected function 166. For example, in place of repeated calls to the protected function 166, the replacement unit 137 can cause one of several possible alternate functions 169A-D to be randomly or pseudo-randomly called; in particular the replacement unit 137 can cause the instruction fetch unit 101 to randomly or pseudo-randomly fetch one of the alternate instructions 158A-D (which each corresponds to an alternate function 169A-D), in place of the protected instruction 141 (which corresponds to the protected function 166).

Each alternate function may achieve the same general result (e.g., performance of a security-related operation) as the protected function, but it may do so with a different sequence of instructions that have different timing and/or different power consumption characteristics. For example, to implement a multiplication operation, one alternate function may utilize a multiplication instruction to perform portions of the operation in hardware; another alternate function may utilize a series of logical shift operations and perform corresponding portions of the operation in software (e.g., microcode). As another example, one alternate function may implement an XOR operation using an XOR instruction that utilizes certain dedicated hardware resources in the execution unit 131; another alternate function may implement the same XOR operation using a series of OR, AND and NOT instructions that may take longer to perform the operation and use different dedicated hardware resources. As another example, one alternate function may employ registers 134 to store intermediate operands needed by an operation; another alternate function may employ memory 122 to store the same intermediate operands.

To randomly or pseudo-randomly select one of a number of alternate instructions, the replacement unit 137, in some implementations, employs a pseudo-random/random address generator 172 that generates a pseudo-random/random address for the multiplexer 155 or 163, to cause the multiplexer 155 or 163 to output a pseudo-randomly or randomly selected alternate instruction address 158A-D to be written to the program address pointer 119.

In various implementations, different numbers of alternate instructions are available for replacement of a protected instruction. As shown, four alternate instructions 158A-D correspond to the protected instruction "PF$_1$" 141; however, in other implementations, a single alternate instruction is provided, and the replacement unit 137 randomly or pseudo-randomly selects either the single alternate instruction or the protected instruction itself; in other implementations, a larger number of possible alternate instructions corresponds to a protected function.

Figure 2:
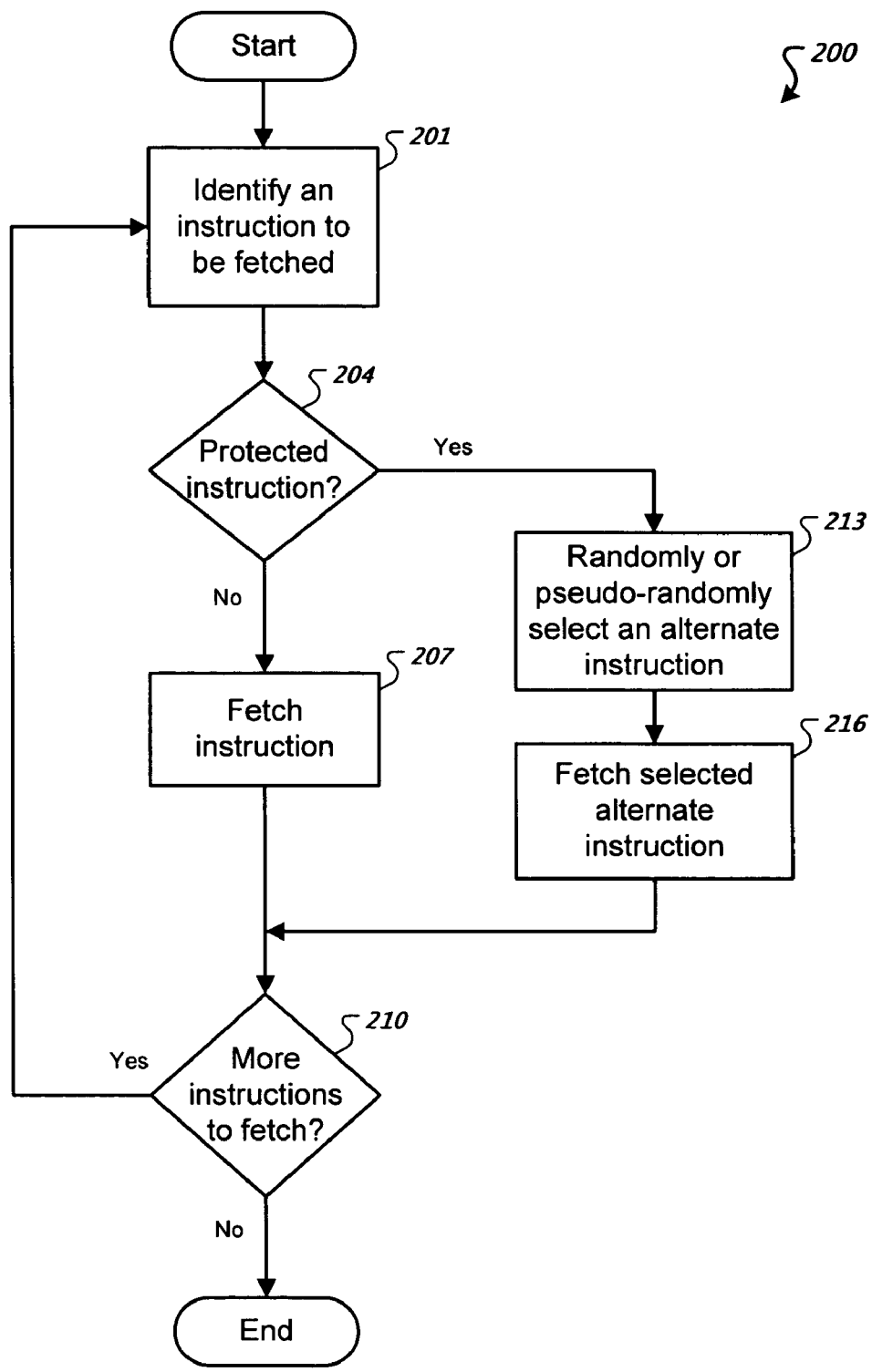
FIG. 2 is a flow diagram of an example method of fetching instructions.

FIG. 2 is a flow diagram of an example method 200 of fetching instructions. The method 200 may be implemented by a device in order to minimize the usefulness of information leaked from the device and thereby strengthen security of sensitive information stored on or processed by the device. In particular, the method 200 may be employed to replace certain instructions (e.g., protected instructions) with randomly or pseudo-randomly selected alternate functions.

As shown, the method 200 includes identifying (201) an instruction to be fetched. For example, referring to FIG. 1A, the instruction fetch unit 101 identifies (201) an instruction to be fetched; more particularly, the instruction fetch unit 101 identifies (201) an address of an instruction to be fetched from memory 122, based on contents of the program address pointer 119.

The method 200 includes determining (204) whether the identified (201) instruction is a protected instruction. For example, in some implementations, the control unit 152 determines (204) whether the address 146 stored in the program address pointer 119 corresponds to any of the addresses 141-142 stored in the first memory portion 140.

If the identified (201) instruction is not a protected instruction, the method 200 includes fetching (207) the instruction. For example, the instruction fetch unit 101 fetches (207) from the memory 122 an instruction that corresponds to the address 146 currently stored in the program address pointer 119. The fetched (207) instruction is subsequently decoded and executed. The method 200 then determines (210) if there are other instructions to fetch, and if so, identifies (201) the next instruction to fetch.

If the identified (201) instruction is a protected instruction, the method 200 includes selecting (213) (e.g., randomly or pseudo-randomly) an alternate instruction. For example, in some implementations, the control unit 152, in conjunction with a pseudo-random/random address generator 172 and multiplexer 155 selects one of several alternate instructions (e.g., "AF$_{1A}$," "AF$_{1B}$," "AF$_{1C}$" or "AF$_{1D}$") that correspond to the identified, protected instruction (e.g., "PF$_1$").

The method 200 includes fetching (216) the selected (213) alternate instruction. For example, in some implementations, the control unit 152, in conjunction with the pass-through buffer 161, causes an alternate instruction address (e.g., "AF$_{1B}$") to be stored in the program address pointer 119, and the instruction fetch unit 101 subsequently fetches (216) an instruction from memory 122 that corresponds to the selected (213) alternate instruction address. In some implementations, the selected (213) alternate instruction address corresponds to an instruction in an alternate function (e.g., alternate function 169B), rather than an instruction in a protected function (e.g., protected function 166). The method 200 then determines (210) if there are other instructions to fetch, and if so, identifies (201) the next instruction to fetch.

Figure 3A:
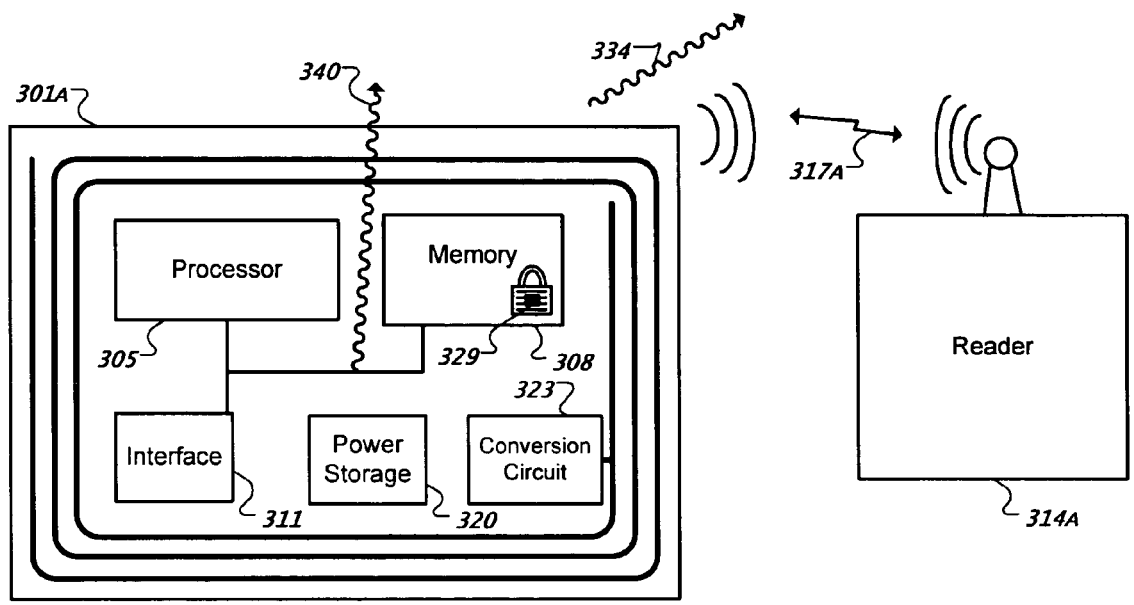
FIGS. 3A and 3B are block diagrams of example smart cards that may be used to store and/or process sensitive information.
Figure 3B:
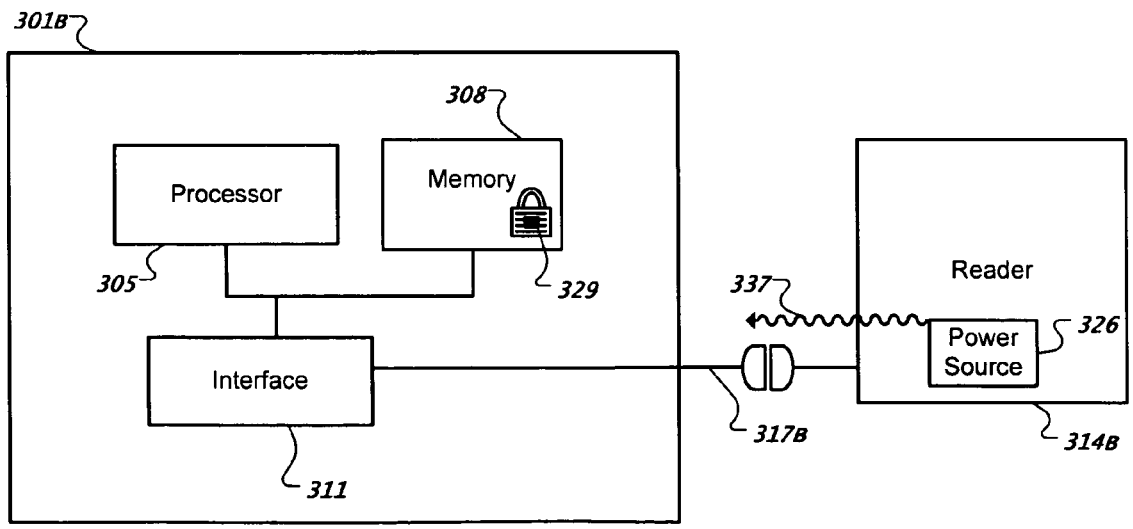

FIGS. 3A and 3B are block diagrams of example smart cards 301A and 301B that may be used to store and/or process protected information. In each of the example smart cards 301A and 301B, protected information 329 stored in the smart cards 301A or 301B may be protected by the systems and methods described herein. As shown, each example smart card 301A or 301B includes a processor 305 (e.g., a microprocessor or microcontroller) configured to execute instructions stored in memory 308 or received via an interface 311. The memory 308 may represent multiple different kinds of memory, such as, for example, ROM or RAM, flash, DRAM, SRAM, etc. For example, in some implementations, program instructions are stored on ROM, and the processor 305 uses some form of RAM to store intermediate data as the programming instructions are executed.

The interface 311 provides a means for the smart cards 301A or 301B to interact with external systems, such as, for example, a smart card reader 314A or 314B. In some implementations, the interface 311 works in conjunction with a wireless communication channel 317A that includes, for example, RF (radio frequency) signals that are adapted for a particular communication protocol (e.g., a protocol characterized by ISO/IEC 14443 or ISO/IEC 15693 (ISO refers to the International Organization for Standardization; IEC refers to the International Electrotechnical Commission)). In some implementations, the interface 311 works in conjunction with a wired communication channel 317B that is adapted for a particular communication protocol (e.g., a protocol characterized by ISO/IEC 7816 or ISO/IEC 7810).

The smart cards 301A or 301B are powered by a power source. For example, the smart card 301A can be powered by an integrated power storage device 320, such as a battery or low-loss capacitor. As another example, the smart card 301A can be powered by an antenna and conversion circuit 323 that receives RF signals and converts energy in the RF signals to electrical energy that can be used to power the components of the smart card 301. As another example, the smart card 301B can be powered by a source that is external to the smart card itself, such as a power supply 326 that is integrated in a corresponding smart card reader 314B.

The smart cards 301A or 301B can store various protected information 329, such as, for example, information that identifies a user, a user's financial or service account, an encryption or decryption key, biometrics information, etc. In some implementations, protected information 329 is protected by an encryption or decryption algorithm that uses one or more keys that are either also stored in the memory 308, provided by the smart card reader 314A or 314B, or both.

In operation, the smart card reader 314A or 314B can request protected information 329 from the smart card 301A or 301B. In some implementations, the smart card reader 314A or 314B provides an encryption key for the smart card 301A or 301B to use in encrypting the protected information 329 before transmitting it to the reader 314A or 314B. In some implementations, the protected information 329 is already stored in encrypted form, and the smart card reader 314A or 314B provides a decryption key to decrypt the protected information 329 before providing it to the reader 314A or 314B. In some implementations, the smart card 301A or 301B performs other operations on the protected information 329.

A hacker may invasively or non-invasively monitor the smart card 301A or 301B as it processes the protected information 329, in order, for example, to subsequently access or corrupt the protected information 329. For example, the hacker may monitor side channel information such as electromagnetic radiation 334 emitted by the smart card 301A or 301B as it processes the protected data 319. Alternatively, the hacker may monitor variations in power consumption 337 as the smart card 301B processes the protected information 329. The hacker may monitor radio frequency communication 317A between the smart card 301A and the smart card reader 314A. The hacker may physically modify the smart card 301A and invasively probe data 340 that is exchanged on data paths internal to the smart card 301A.

By monitoring the operation of the smart card 301A or 301B as it processes the protected information 329, a hacker may be able to learn enough about the operation of the smart card 301A or 301B or about the protected information 329 to corrupt or access the protected information 329. For example, an encryption or decryption algorithm applied to the protected information 329 may follow a particular encryption or decryption method (e.g., DES or AES) having a predictable series of operations. If the smart card executes these operations in the same manner each time the encryption or decryption algorithm is performed, information "leaked" from the smart card may have certain predictable characteristics. In particular, variation in power consumption or variations in radiated electromagnetic energy may have a predictable "signature." By monitoring the variations in power consumption or radiated electromagnetic energy, a hacker may be able to statistically identify the signature and correlate the signature with certain portions of the standard encryption or decryption algorithm. Armed with such information, a hacker may be able to extract individual bits of an encryption or decryption key, or time other attacks of the smart card (e.g., voltage glitches, clock adjustments, radiation-based attacks, etc.) that allow the hacker to cause the smart card 301A or 301B to bypass a security operation (e.g., the encryption or decryption algorithm itself), or that allow the hacker to corrupt certain data.

The value of leaked information, such as variations in power consumption or emitted electromagnetic radiation, may be significantly reduced in devices that randomize the execution of certain functions. In particular, a hacker may have significantly greater difficulty correlating the variations in power consumption or emitted electromagnetic radiation to specific portions of a standard encryption or decryption algorithm if each time that portion of the standard algorithm is executed, it is executed with different instructions having different power consumption or emitted electromagnetic energy profiles. A system such as that described with reference to FIGS. 1A, 1B and 2 can replace instructions that are associated with a standard algorithm, such that power consumption and radiated electromagnetic energy profiles are potentially different each time the algorithm is executed.

Figure 4:
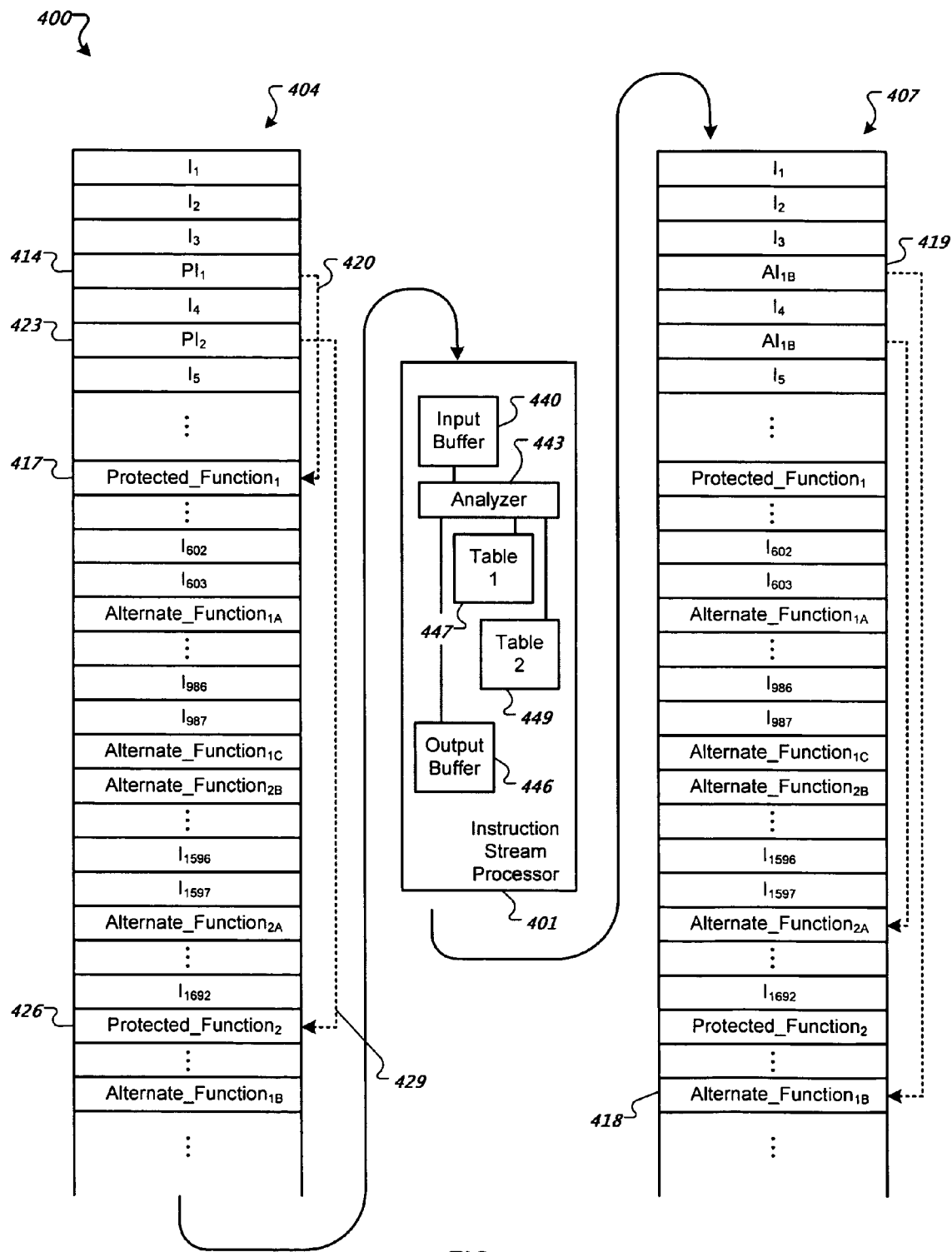
FIG. 4 is a diagram of an example system that may be used to process instructions in an instruction stream.

Execution of instructions associated with standard security algorithms or protected functions can be randomized in ways other than those described with reference to FIGS. 1A, 1B and 2. For example, FIG. 4 illustrates a system 400 that can be used to process instructions in an instruction stream—for example, prior to execution of the instructions by a computing device such as, the devices 100, 301A or 301B.

As shown, the system 400 includes an instruction stream processor 401 that processes an incoming instruction stream 404 to produce an outgoing instruction stream 407. The incoming instruction stream 404 includes individual instructions (e.g., $I_1, I_2, \ldots I_n$) and groups of instructions that make up functions (e.g., Protected_Function$_n$, Alternate_Function$_n$, etc.) When executed, certain instructions may cause one of the functions to be called. For example, as shown, PI$_1$ 414 points to Protected_Function$_1$ 417 (pointer link depicted by dashed line 420); PI$_2$ 423 points to Protected_Function$_2$ 426 (pointer link depicted by dashed line 429). Execution of instruction PI$_1$ 414 causes program execution to jump to the instructions in the Protected_Function$_1$ 417. In some implementations, PI$_1$ is a "jump" or "call" instruction; in other implementations, PI$_1$ is another instruction that is capable of changing flow of an otherwise sequential execution of program instructions.

As shown, the incoming instruction stream 404 includes a number of functions that may or may not be called. For example, the incoming instruction stream 404 may include Alternate_Function$_{1B}$ and Alternate_Function$_{2B}$, even though the instructions in these functions may never be executed.

The instruction stream processor 401 receives the incoming instruction stream 404, analyzes each instruction, and optionally replaces certain instructions. In some implementations, the instruction stream processor 401 is a post-compiler processor that modifies an instruction stream before the instruction stream is stored in a computing device's instruction memory. In some implementations, the instruction stream processor 401 is included in a device's instruction fetch unit. For example, referring to FIG. 1A, the instruction stream processor 401 can be included in the instruction fetch unit 101 or in the replacement unit 137. In some implementations, the instruction stream processor 401 is a microcode-driven instruction processor that analyzes and optionally replaces instructions to be fetched (e.g., based on their addresses), before the instructions are actually fetched.

The instruction stream processor 401 can analyze each instruction to determine if it is an instruction that calls a protected function. If the instruction does not call a protected function, the instruction stream processor 401 can analyze the next sequential instruction. If the instruction is one that calls a protected function, the instruction stream processor 401 can replace the instruction with an instruction that calls an alternate function. For example, the instruction stream processor 401 can replace instruction PI$_1$ in the incoming instruction stream 404 with instruction AI$_{1B}$ 419 in the outgoing instruction stream 407. Whereas the instruction PI$_1$, when executed, calls Protected_Function$_1$ 417, the alternate instruction AI$_{1B}$ 419, when executed, calls Alternate_Function$_{1B}$ 418.

To replace an instruction that calls a protected function with an alternate instruction that calls an alternate function, the instruction stream processor 401 selects (e.g., randomly or pseudo-randomly) the alternate instruction from a number of possible alternate instructions. For example, the instruction stream processor 401 can replace the instruction PI$_1$ 414 with one of AI$_{1A}$ (an instruction that calls Alternate_Function$_{1A}$), AI$_{1B}$ (an instruction that calls Alternate_Function$_{1B}$), AI$_{1C}$ (an instruction that calls Alternate_Function$_{1C}$), or AI$_{1D}$ (an instruction that calls Alternate_Function$_{1D}$). In some implementations (not shown), the instruction PI$_1$ may also be included among the possible alternate instructions, such that PI$_1$ may be occasionally selected to not be replaced.

In some implementations, the instruction stream processor 401 includes an input buffer 440, an analyzer 443 and an output buffer 446. As shown, the instruction stream processor 401 also includes a first table 447 that stores instructions that call protected functions, and a second table 449 that stores alternate instructions corresponding to the instructions that call protected functions; the alternate instructions call alternate functions. The instruction stream processor 401 can buffer, in the input buffer 440, instructions from the incoming instruction stream 404; analyze the buffered instructions with the analyzer 443; and either transfer the analyzed instructions as-is to the output buffer 446, or replace the analyzed instructions with alternate instructions in the output buffer 446. The analyzer 443 can compare an instruction in the input buffer 440 to each instruction stored in the first table 447; if there is a match, the instruction stream processor 401 selects (e.g., randomly or pseudo-randomly) a corresponding alternate instruction from the second table 449 to write to the output buffer 446; if there is not a match, the instruction stream processor 401 writes the analyzed instruction as-is to the output buffer 446. The outgoing instruction stream 407 can flow from the output buffer 446.

Figure 5:
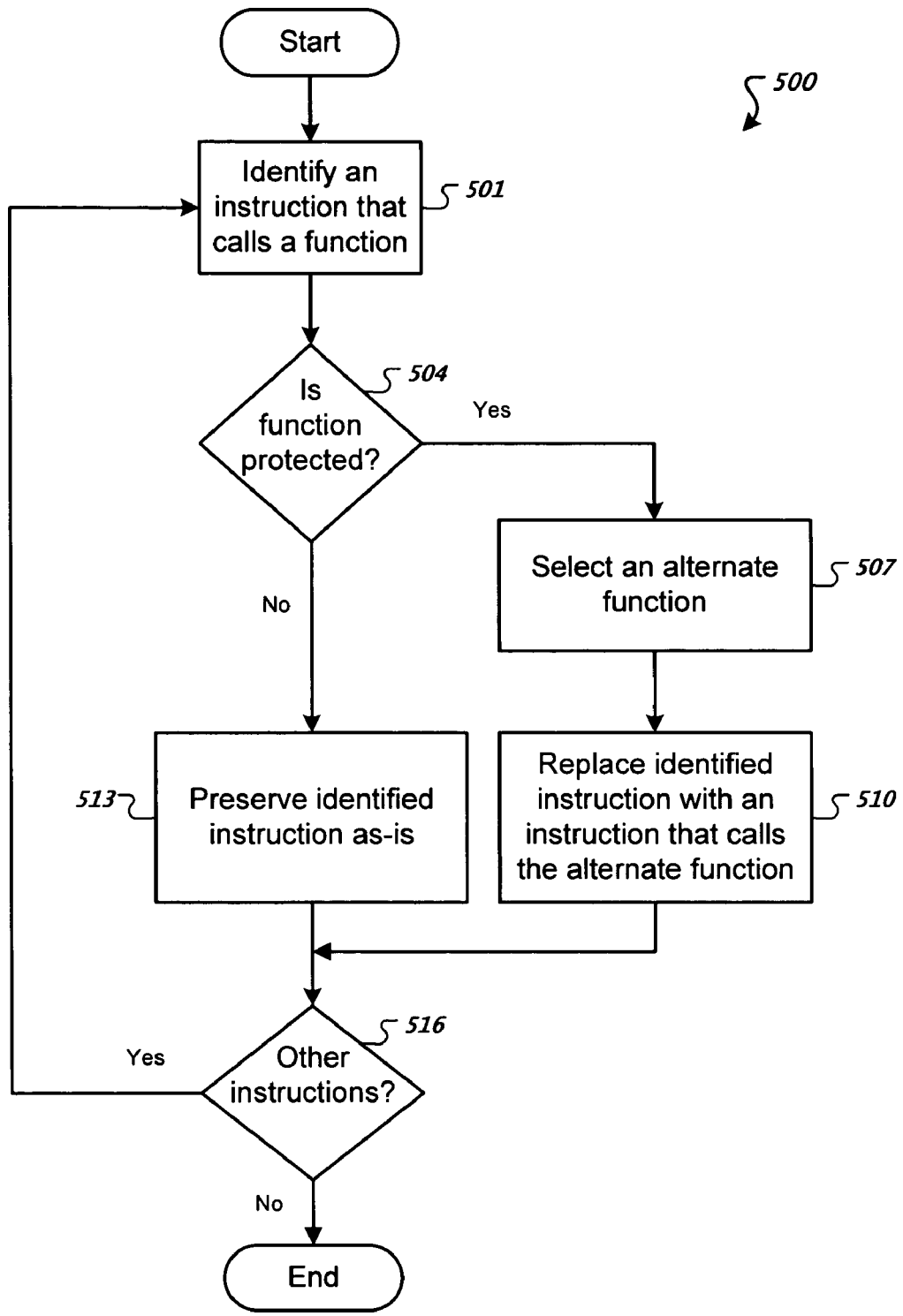
FIG. 5 is a flow diagram of an example method of processing instructions in an instruction stream.

FIG. 5 is a flow diagram that further illustrates an example method 500 of analyzing and optionally replacing instructions in an instruction stream. In some implementations, the method 500 is implemented in an instruction stream processor, such as the instruction stream processor 401 that is shown in FIG. 4.

As shown, the method 500 includes identifying (501) an instruction that calls a function. For example, the instruction stream processor 401 employs the analyzer 443 to determine whether an instruction in the input buffer 440 calls a function. In particular, the analyzer 443 determines whether the instruction is a jump or call instruction, or another instruction that is capable of altering the execution flow of programming instructions.

Upon identifying an instruction that calls a function, the method 500 determines (504) whether the identified instruction calls a function that is protected. For example, the analyzer 443 determines (504) whether the identified instruction calls a protected function—e.g., by comparing the identified instruction to instructions stored in the first table 447 that each call protected functions.

If the identified instruction does not call a protected function, the method 500 includes preserving (513) the identified instruction unchanged. For example, the instruction stream processor 401 can cause the identified instruction to be written to the output buffer 446 as-is.

If the identified instruction does call a protected function (when executed), the method 500 includes selecting (507) an alternate function, and replacing (510) the identified instruction with an instruction that calls the alternate function. For example, if the analyzer 443 determines that the identified instruction calls a protected function, the instruction stream processor 401 selects an alternate function (or an alternate instruction that calls an alternate function), for example, from a number of corresponding possible alternate instructions stored in the second table 449; to make the selection, the instruction stream processor 401 employs a random or pseudo-random selector (not shown in FIG. 4). The instruction stream processor 401 then stores the selected alternate function in the output buffer 446.

After processing a first instruction that calls a function, the method 500 includes determining (516) whether there are other instructions to be processed, and if so, identifying (501) possible other instructions that call functions.

A number of implementations have been described. Nevertheless, it will be understood that various modifications may be made without departing from the spirit and scope of the disclosed implementations. For example, although some of the disclosed implementations relate to smart cards or other secure integrated circuit devices, the systems and methods described herein may be applied to any device that executes or processes programming instructions. Moreover, the replaced instructions need not be "protected" nor need they relate to encryption of decryption algorithms. Accordingly, other implementations are within the scope of the following claims:

What is claimed is:

1. A method performed by an instruction fetch unit, the method comprising:
  identifying an instruction to be fetched, wherein the instruction, when executed by one or more processors, causes the one or more processors to perform a certain function;
  determining if the identified instruction is protected;
  if the identified instruction is protected, selecting an alternate instruction from a plurality of alternate instructions corresponding to the identified protected instruction, and fetching the selected alternate instruction instead of the identified instruction, wherein each of the alternate instructions, when executed by the one or more processors, causes the one or more processors to perform the certain function that would have been performed by the one or more processors when executing the instruction to be fetched, wherein selecting the alternate instruction comprises randomly or pseudo-randomly selecting the alternate instruction from the plurality of alternate instructions; and
  if the identified instruction is not protected, fetching the identified instruction.

2. The method of claim 1, wherein identifying the instruction to be fetched comprises identifying an address stored in a program address pointer.

3. The method of claim 2, wherein determining if the identified instruction is protected comprises comparing the address stored in the program address pointer to one or more addresses stored in a first memory portion, and determining if there is a correspondence.

4. The method of claim 3, wherein randomly or pseudo-randomly selecting the alternate instruction comprises randomly or pseudo-randomly selecting an instruction from one or more corresponding alternate instructions stored in a second memory portion, and storing the selected instruction in the program address pointer.

5. The method of claim 1, wherein identifying an instruction to be fetched comprises identifying an opcode and corresponding operand stored in an instruction buffer.

6. The method of claim 5, wherein determining if the identified instruction is protected comprises comparing the identified opcode and corresponding operand to one or more opcodes and corresponding operands stored in a first memory portion, and determining if there is a correspondence.

7. The method of claim 6, wherein selecting an alternate instruction comprises randomly or pseudo-randomly selecting an alternate opcode/operand combination from one or more corresponding alternate opcode/operand combinations stored in a second memory portion, and storing the selected alternate opcode/operand combination in the instruction buffer.

8. The method of claim 1, wherein at least one of the alternate instructions has a different power consumption characteristic than the instruction.

9. The method of claim 1, at least one of the alternate instructions has a different timing characteristic than the instruction.

10. An instruction fetch unit comprising:
a first memory portion whose contents identify an address of a protected instruction, wherein the protected instruction, when executed by one or more processors, causes the one or more processors to perform a certain function;
a second memory portion whose contents store addresses of a plurality of alternate instructions corresponding to the protected instruction, wherein each of the alternate instructions, when executed by the one or more processors, causes the one or more processors to perform the certain function that would have been performed by the one or more processors when executing the protected instruction;
a replacement unit that a) determines whether an instruction to be fetched corresponds to the contents of the first memory portion, and if so, b) replaces an address associated with the instruction to be fetched with an address selected from the second memory portion, wherein replacing the address associated with the instruction to be fetched comprises randomly or pseudo-randomly selecting an address of an instruction from corresponding addresses in the second memory portion, and replacing the contents of the first memory portion with the selected address; and
an interface that fetches an instruction.

11. The instruction fetch unit of claim 10, further comprising a pseudo-random/random address generator that selects a corresponding address from the second memory portion to use in replacing the address associated with instruction to be fetched.

12. An instruction fetch unit comprising:
a first memory portion whose contents identify an address of an instruction to be fetched;
a second memory portion whose contents identify an address of a protected instruction, wherein the protected instruction, when executed by one or more processors, causes the one or more processors to perform a certain function;
a third memory portion whose contents store addresses of a plurality of alternate instructions corresponding to the protected instruction, wherein each of the alternate instructions, when executed by the one or more processors, causes the one or more processors to perform the certain function that would have been performed by the one or more processors when executing the protected function;
a replacement unit that a) determines whether the contents of the first memory correspond to the contents of the second memory, and if so, b) replaces the contents of the first memory with an address selected from the third memory, wherein replacing the contents of the first memory portion with the address selected from the third memory portion comprises randomly or pseudo-randomly selecting a corresponding address of an alternate instruction from the third memory portion, and replacing the contents of the first memory portion with the selected address; and
an interface that fetches an instruction corresponding to the contents of the first memory.

13. The instruction fetch unit of claim 12, wherein the first memory portion comprises a program address pointer.

14. The instruction fetch unit of claim 12, wherein the first memory portion comprises a program counter.

15. The instruction fetch unit of claim 12, wherein the second memory portion comprises a protected function address register.

16. A method, performed by an instruction fetch unit, of processing instructions in an instruction stream, the method comprising:
identifying an instruction in an instruction stream that calls a function;
determining if the function to be called is a protected function, wherein the protected function causes one or more processors to perform one or more actions and reach a result; and
if the function to be called is a protected function, selecting an alternate function from a plurality of alternate functions corresponding to the protected function, wherein selecting the alternate instruction comprises randomly or pseudo-randomly selecting an alternate instruction from the plurality of alternate instructions, and wherein each alternate function causes one or more processors to perform one or more different actions and reach the result of the protected function, and replacing the identified instruction with an instruction that calls the selected alternate function.

17. The method of claim 16, wherein the instruction stream is a sequence of compiled instructions to be written to a computing device's instruction memory.

18. The method of claim 16, wherein the instruction stream is a sequence of instructions in a computing device's instruction buffer.

19. An instruction fetch unit comprising:
a program address pointer that stores an address of an instruction to be fetched;
a protected instruction address register (PIAR) that stores an address of a protected instruction, wherein the protected instruction, when executed by one or more processors, causes the one or more processors to perform a certain function;
a memory portion that stores addresses of a plurality of alternate instructions corresponding to the protected instruction, wherein each of the alternate instructions, when executed by the one or more processors, causes the one or more processors to perform the certain function that would have been performed by the one or more processors when executing the protected instruction;
a replacement unit that a) determines whether the address stored in the program address pointer corresponds to the address stored in the PIAR, and if so, b) replaces the address stored in the program address pointer with an address selected from the addresses stored in the memory portion, wherein replacing the address stored in the program address pointer comprises randomly or pseudo-randomly selecting a corresponding address of an alternate instruction from the memory portion, and replacing the address stored in the program address pointer with the selected address; and an interface that fetches an instruction corresponding to either the address stored in the program address pointer or the replaced address stored in the program address pointer.

20. The instruction fetch unit of claim 19, further comprising a pseudo-random/random address generator that selects an address with which to replace the address stored in the program address pointer from the addresses stored in the memory portion.

21. A device comprising:
a processor that executes programming instructions;
a memory portion that stores programming instructions;
an instruction fetch unit that fetches a programming instruction from the memory portion and provides the fetched programming instruction to the processor for execution; and
a replacement unit that replaces the fetched programming instruction with an alternate programming instruction selected from a plurality of alternate programming instructions corresponding to the fetched programming instruction, wherein selecting the alternate instruction comprises randomly or pseudo-randomly selecting the alternate instruction from the plurality of alternate instructions, and provides the alternate programming instruction to the processor for execution when the fetched programming instruction is a protected programming instruction, wherein the protected programming instruction, when executed by the processor, causes the processor to perform a certain function, and wherein each of the alternate programming instructions, when executed by the processor, causes the processor to perform the certain function that would have been performed by the processor when executing the protected programming instruction.

22. The device of claim 21, further comprising an interface that receives input to be processed by the processor from a wired communication channel.

23. The device of claim 22, wherein the wired communication channel comprises a smart card reader contact.

24. The device of claim 21, further comprising an interface that receives input to be processed by the processor from a wireless communication channel.

25. The device of claim 24, wherein the wireless communication channel comprises a smart card reader interface, a portion of which complies with International Organization for Standardization (ISO)/International Electrotechnical Commission (IEC) standard 14443 or standard 15693.

26. The device of claim 21, wherein the device further comprises a power conversion circuit that receives electromagnetic energy from a source external to the device and converts the electromagnetic energy to electrical energy that powers at least one of the processor, the memory portion, the instruction fetch unit or the replacement unit.

27. The device of claim 21, further comprising a power storage device that powers at least one of the processor, the memory portion, the instruction fetch unit or the replacement unit.

28. A device comprising:
a processor means that executes programming instructions;
a memory means that stores programming instructions;
an instruction fetch means that fetches a programming instruction from the memory means and provides the fetched programming instruction to the processor means for execution; and
a replacement means that replaces the fetched programming instruction with an alternate programming instruction selected from a plurality of alternate programming instructions corresponding to the fetched programming instruction, wherein selecting the alternate instruction comprises randomly or pseudo-randomly selecting the alternate instruction from the plurality of alternate instructions, and provides the alternate programming instruction to the processor means for execution when the fetched programming instruction is a protected programming instruction, wherein the protected programming instruction, when executed by the processor means, causes the processor means to perform a certain function, and wherein each of the alternate programming instructions, when executed by the processor means, causes the processor means to perform the certain function that would have been performed by the processor when executing the protected programming instruction.

29. The device of claim 28, further comprising a means for determining whether the fetched programming instruction is a protected programming instruction.

30. The device of claim 28, further comprising an interface means that receives input to be processed by the processor means from a wireless communication channel.

31. The device of claim 28, wherein the wireless communication channel comprises a smart card reader interface, a portion of which complies with International Organization for Standardization (ISO)/International Electrotechnical Commission (IEC) standard 14443 or standard 15693.

32. The device of claim 28, further comprising a power conversion means that receives electromagnetic energy from a source external to the device and converts the electromagnetic energy to electrical energy that powers at least one of the processor means, the memory means, the instruction fetch means or the replacement means.

* * * * *